United States Patent
Wu et al.

(10) Patent No.: US 8,464,105 B2
(45) Date of Patent: Jun. 11, 2013

(54) METHOD OF MULTIUSER PRECODING AND SCHEDULING AND BASE STATION FOR IMPLEMENTING THE SAME

(75) Inventors: Keying Wu, Shanghai (CN); Lei Wang, Shanghai (CN)

(73) Assignee: Alcatel Lucent, Paris (FR)

( * ) Notice: Subject to any disclaimer, the term of this patent is extended or adjusted under 35 U.S.C. 154(b) by 465 days.

(21) Appl. No.: 12/675,208

(22) PCT Filed: Aug. 15, 2008

(86) PCT No.: PCT/CN2008/001473
§ 371 (c)(1),
(2), (4) Date: Feb. 25, 2010

(87) PCT Pub. No.: WO2009/030102
PCT Pub. Date: Mar. 12, 2009

(65) Prior Publication Data
US 2010/0306613 A1 Dec. 2, 2010

(30) Foreign Application Priority Data
Aug. 29, 2007 (CN) .......................... 2007 1 0045530

(51) Int. Cl.
*G01R 31/28* (2006.01)
(52) U.S. Cl.
USPC .......................................... 714/712

(58) Field of Classification Search
USPC .......................................... 714/712
See application file for complete search history.

(56) References Cited

U.S. PATENT DOCUMENTS

| | | | |
|---|---|---|---|
| 2003/0125040 A1* | 7/2003 | Walton et al. | 455/454 |
| 2005/0032521 A1* | 2/2005 | Lee et al. | 455/450 |
| 2006/0121946 A1* | 6/2006 | Walton et al. | 455/561 |
| 2007/0281746 A1* | 12/2007 | Takano et al. | 455/562.1 |
| 2008/0070564 A1* | 3/2008 | Li et al. | 455/424 |
| 2009/0046786 A1* | 2/2009 | Moulsley et al. | 375/260 |

FOREIGN PATENT DOCUMENTS

| | | |
|---|---|---|
| CN | 1592144 A | 3/2005 |
| CN | 1613201 A | 5/2005 |

OTHER PUBLICATIONS

International Search Report, Apr. 2007.

* cited by examiner

*Primary Examiner* — Joshua Lohn
(74) *Attorney, Agent, or Firm* — Fay Sharpe LLP

(57) ABSTRACT

The present invention provides a method of multiuser precoding and scheduling, comprising: feeding channel state information (CSI) and statistic properties of CSI error back to a base station (BS) from a user equipment (UE); generating multiuser precoding matrix and scheduling scheme by the BS, according to the feedback CSI and the statistic properties of CSI error; and performing multiuser precoding and scheduling on user data by using the generated multiuser precoding matrix and scheduling scheme.

16 Claims, 2 Drawing Sheets feed CSI and statistic properties of CSI error from UE back to BS(101)

generate multiuser precoding matrix and scheduling scheme at BS, according to the feedback CSI and the statistic properties of CSI error (103)

Perform multiuser precoding and scheduling at the BS(105)

US 8,464,105 B2

METHOD OF MULTIUSER PRECODING AND SCHEDULING AND BASE STATION FOR IMPLEMENTING THE SAME

BACKGROUND OF THE INVENTION

1. FIELD OF INVENTION

The present invention relates to radio Multiple Input Multiple Output (MIMO) communication system, and particularly to method of multiuser (MU) precoding and scheduling, which can generate multiuser precoding matrix and scheduling scheme for multiuser precoding and scheduling by using channel state information (CSI, which may be inaccurate due to various factors such as feedback quantization, feedback delay and the like) and statistic properties of CSI error fed back from a user side.

2. DESCRIPTION OF PRIOR ART

Recently, MU-MIMO has attracted much attention due to its advantage in capacity as well as the ability to work with single-antenna users (SU) and still maintain MIMO advantages.

Compared with SU-MIMO, the transmission processing of MU-MIMO is complicated due to the fact that each user must decode its messages independently without joint operation with other users. The core problem is how to solve co-channel interference (CCI) among users.

To solve this problem, multiuser precoding techniques are used in the MU-MIMO system to control or totally avoid CCI among users, so that each user suffers no or only limited interference from other users. For a total avoidance or effective control of CCI, full CSI for all users is required at the transmitter, which is only an assumption impractical to actual systems. In practice, full CSI is difficult to be achieved, and thus imperfect CSI is always used at the transmitter. With such imperfect CSI, the CCI among users cannot be totally avoided even using zero-forcing-type precoding algorithms. The residual CCI due to imperfect CSI cannot be suppressed at the receiver by common interference-suppression methods such as maximum-likelihood (ML) or minimum-mean-square-error (MMSE) detection. As a result, the CCI can only be regarded as additive noise whose average power grows with an increase in the total transmission power. This characteristic of the CCI restricts significantly the performance of MU-MIMO, especially at high SNRs.

SUMMARY OF THE INVENTION

In order to address deterioration of MU-MIMO performance caused by the residual CCI due to imperfect CSI at the transmitter, the present invention provides a method of multiuser precoding and scheduling in which multiuser precoding matrix and scheduling scheme for multiuser precoding and scheduling is generated by using CSI information and statistic properties of CSI error fed back from a user. The precoding matrix and scheduling scheme thus generated can adapt to a situation that channel information at the transmitter is imperfect, reduce the residue CCI, and thus reduce the deterioration of MU-MIMO performance due to imperfect CSI.

An object of the present invention is to provide a method of multiuser precoding and scheduling, comprising: feeding CSI and statistic properties of CSI error back to a base station (BS) from a user equipment (UE); generating, at the BS, multiuser precoding matrix and scheduling scheme according to the feedback CSI and the statistic properties of CSI error; and performing multiuser precoding and scheduling on user data by using the generated multiuser precoding matrix and scheduling scheme.

Preferably, the CSI is an estimation of a channel matrix.

Preferably, the statistic properties of CSI error comprise a covariance matrix of errors of the estimation of the channel matrix.

Preferably, the multiuser precoding uses a minimum-mean-square-error (MMSE)-type algorithm.

Preferably, the MMSE-type algorithm is a successive MMSE algorithm.

Preferably, the multiuser scheduling uses a capacity-maximization criterion.

Preferably, the statistic properties of the CSI error are obtained by measuring channel estimation error, feedback error and quantization error.

Preferably, the method is used in a MU-MIMO communication system.

The present invention also provides a base station, comprising: a reception device for receiving CSI and statistic properties of CSI error which are fed back from a UE; a multiuser precoding matrix and scheduling scheme generation device for to generating multiuser precoding matrix and scheduling scheme according to the feedback CSI and the statistic properties of CSI error; and a multiuser precoding and scheduling device for performing multiuser precoding and scheduling on user data by using the generated multiuser precoding matrix and scheduling scheme.

BRIEF DESCRIPTION OF THE DRAWINGS

The objects, advantages and characteristics of the present invention will be more apparent, according to descriptions of preferred embodiments in connection with the drawings, wherein.

DETAILED DESCRIPTION OF PREFERRED EMBODIMENTS

Figure 1:
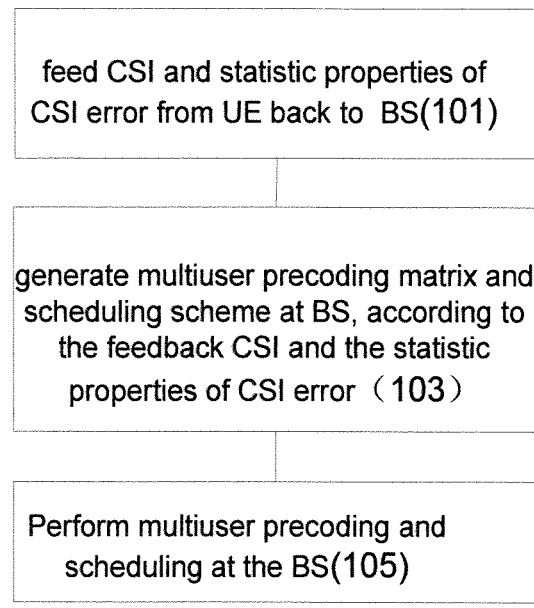
FIG. 1 is a flow chart of a method of multiuser precoding and scheduling according to the present invention.

With imperfect CSI, the transmitter cannot generate a multiuser precoding matrix that exactly matches the multiuser channel. Such mismatch leads to additional CCI among users, which increases with the transmission power and seriously restricts the performance of MU-MIMO, especially at high SNRs. The CCI caused by CSI error cannot be suppressed at a receiver by common interference-suppression methods such as maximum-likelihood (ML) and MMSE detection. The effect is similar to an increase in additive noise. The basic idea of the present invention is to study the relationship between such CCI level and the precoding/scheduling results, and to use this relationship to adjust the precoding and scheduling algorithms to better suit the imperfect CSI environment. According to the present invention, a method of multiuser precoding and scheduling is provided to better control the CCI level due to CSI error and improve MU-MIMO performance with imperfect CSI at the transmitter.

In the present invention, it is assumed that the statistical properties of CSI error are available at the transmitter. For multiuser precoding, a MMSE-type algorithm is generally used, due to its ability to balance interference and noise. Here, the CCI caused by CSI error may be regarded as AWGN (Additive White Gaussian Noise), and a relationship between the average power of CSI error and a precoding/filtering matrix may be established based on a variance matrix of CSI error. Then, the CCI level, precoding and filtering matrixes are optimized jointly according to the MMSE criterion.

In the present invention, for multiuser scheduling, we adopt the capacity-maximization criterion and select a user/mode subset with the maximum achievable sum capacity. Similarly, a relationship between the CSI-error-related CCI level and the user/mode selection may be established and used to adjust scheduling operation, by regarding the CCI as AWGN in estimating the sum capacity for each user/mode subset.

Hereinafter, the principle of the method of multiuser precoding and scheduling according to the present invention will be described in detail.

Channel Model

Consider a downlink of a multiuser MIMO system with $N_T$ transmit antennas at the BS and K users receiving service from the same BS over the same time-frequency resource, each with $N_R$ receive antennas. (To be noted, K is the number of users served in the same time-slot and frequency band by spatial processing. The total number of users in a cell may be much larger than K).

Assuming frequency-flat fading for all users, a channel matrix for user k is denoted by $H_k=[h_{k,n}^{(m)}]$, where $h_{k,n}^{(m)}$ is the fading coefficient between the nth transmit antenna and the mth receive antenna of user k, The number of data streams dedicated to userk is denoted by $S_k$. It is always assumed that $S_k \leq N_R$ and $\Sigma_{k=1}^{K} S_k \leq N_T$. The data vector $x_k$ of a length $S_k$ for user k is first multiplied with a $N_T \times S_k$ precoding matrix $T_k$ to be linearly transformed to a symbol vector of a length $N_T$ for transmitting from $N_T$ antennas. The length-$N_T$ symbol vectors for K users are then linearly superimposed and transmitted into a channel from the antenna array simultaneously. Here, it is always assumed that the elements of $x_k$ are independent and identically distributed (i.i.d.) with a mean of zero and a unit variance. The total transmission power is then given by $$P_T = \sum_{k=1}^{K} E(\|T_k x_k\|^2) = \sum_{k=1}^{K} \text{trace}(T_k^H T_k) \quad (1)$$

For each user k, the received signal vector is $$y_k = H_k \sum_{k'=1}^{K} T_{k'} x_{k'} + n_k = H_k T_k x_k + H_k \sum_{k' \neq k} T_{k'} x_{k'} + n_k \quad (2)$$

where $n_k$ is a vector of samples of an AWGN process with a mean of zero and a variance of $\sigma^2 = N_0/2$. Each user k then generates an estimate $\hat{x}_k$ for $x_k$ by multiplying $y_k$ with a $S_k \times N_R$ filtering matrix $B_k$, as given by the equation $$\hat{x}_k = B_k y_k \quad (3)$$

$$= B_k H_k \sum_{k'=1}^{K} T_{k'} x_{k'} + B_k n_k$$

-continued
$$= B_k H_k T_k x_k + B_k H_k \sum_{k' \neq k} T_{k'} x_{k'} + B_k n_k$$

In the equation (3), the filtering matrix $B_k$ can be derived based on various criteria, such as MMSE. Based on the equation (3), the maximum mutual information between $\hat{x}_k$ and $x_k$ is $$C_k = \sum_{s=1}^{s_k} \log_2(1 + \text{sinr}_{k,s}) \quad (4)$$

$$= \sum_{s=1}^{s_k} \log_2 \left(1 + \frac{\|b_{k,s}^H H_k t_{k,s}\|^2}{\|b_{k,s}\|^2 \sigma^2 + \sum_{(k',s') \neq (k,s)} \|b_{k,s}^H H_k t_{k',s'}\|^2}\right)$$

where $\text{sinr}_{k,s}$ is the post-processing signal-to-interference-plus-noise ratio (SINR) for the sth element of $x_k$, $b_{k,s}$ represents the sth column of $B_k^T$ and $t_{k,s}$ represents the sth column of $T_k$. The sum mutual information of the overall MU-MIMO systems is then $$C = \sum_{k=1}^{K} C_k \quad (5)$$

In the following, we will design the method of multiuser precoding and scheduling based on the above channel model. For the purpose of clarity, a simpler situation of to perfect CSI at the transmitter (the prior art) will be first introduced, and then the present invention for the situation of imperfect CSI will be described.

Multiuser Precoding and Scheduling with Perfect CSI

Successive MMSE (S-MMSE) Multiuser Precoding

As mentioned above, in the present invention, the MMSE-type multiuser precoding algorithm may be used, due to its ability to balance interference and noise (Here, the noise means both the CCI due to CSI error and the AWGN noise). In particular, the successive MMSE (S-MMSE) algorithm is used, which is a simplified implementation of MMSE-type algorithm in the case that each user has more than one receive antennas.

The basic principle of the MMSE-type algorithm is to find a set of optimal precoding matrix $\{T_k\}$ and filtering matrix $\{B_k\}$ according to the MMSE criterion:

$$(\{T_k\}, \{B_k\}) = \operatorname*{argmin}_{\substack{T_1 \ldots T_K \\ B_1 \ldots B_K}} E\left(\sum_{k=1}^{K} \|x_k - \hat{x}_k\|^2\right) \quad (6)$$

$$= \operatorname*{argmin}_{\substack{T_1 \ldots T_K \\ B_1 \ldots B_K}} E\left(\sum_{k=1}^{K} \left\|x_k - \left(B_k H_k \sum_{k'=1}^{K} T_{k'} x_{k'} + B_k n_k\right)\right\|^2\right).$$

Equation (6) relates to joint optimization problem, and its solution is generally very complicated to obtain. The S-MMSE algorithm, on the other hand, provides a simplified, sub-optimal solution to this problem by iterative operations:

Step 1 Initialize each $B_k$ by generating a random $s_k \times N_R$ matrix;

Step 2 Based on the current $\{B_k\}$, calculate the optimal precoding matrix $\{T_k\}$ according to the MMSE criterion as $$[T_1 \ldots T_K] = H^H B^H (BHH^H B^H + \beta I)^{-1} \qquad (7)$$

where $H = [H_1^T H_2^T \ldots H_K^T]^T,$ (8)

$$B = \begin{bmatrix} B_1 & & 0 \\ & \ddots & \\ 0 & & B_K \end{bmatrix}, \qquad (9)$$

and $\beta = \dfrac{\sigma^2}{P_T}\text{trace } (BB^H);$ (10)

Step 3 Based on $\{T_k\}$ calculated above, update the filtering matrix $\{B_k\}$ according to the MMSE criterion as $$B_k = T_k^H H_k^H \left( \sum_{k'=1}^{K} H_k T_{k'} T_{k'}^H H_k^H + \sigma^2 I \right)^{-H} ; \text{ for } k = 1 \sim K \qquad (11)$$

Step 4 Repeat steps 2 and 3 until the Frobenius norm of the change in $\{T_k\}$ and $\{B_k\}$ drops below a pre-set threshold or the number of iteration operations has reached a certain value;

Step 5 Normalize the final precoding matrix $\{T_k\}$ by $(P_T/\sum_{k=1}^{K}\text{trace}(T_k T_k^H))^{1/2}$.

Multiuser Scheduling

The total user number in the communication system is denoted by N. The scheduler selects a subset of users out of N users for multiuser transmission, and also decides the number of data streams for each selected user. Denote by $\mathcal{K}$ possible scheduling results, and $\mathcal{K}$ can be represented by three parts: the number of the selected users $K(\mathcal{K})$, a set of indexes for the selected users $\{n_k(\mathcal{K}), k=1\sim K(\mathcal{K})\}$ with $1 \leq n_k(\mathcal{K}) \leq N$, and the numbers of data streams for the selected users $\{S_k(\mathcal{K}), k=1\sim K(\mathcal{K})\}$. The scheduler searches over a set of $\mathcal{K}$ and selects the optimal one, denoted by $\hat{\mathcal{K}}$, according to a certain criterion. For example, with the capacity-maximization criterion, the scheduler selects $\hat{\mathcal{K}}$ according to $$\hat{\mathcal{K}} = \underset{\mathcal{K} \in \mathcal{R}}{\text{argmax}} C(\mathcal{K}) \qquad (12)$$

$$= \underset{\mathcal{K} \in \mathcal{R}}{\text{argmax}} \sum_{k=1}^{K(\mathcal{K})} \sum_{s=1}^{S_k(\mathcal{K})} \log_2(1 + sinr_{k,s}(\mathcal{K}))$$

$$= \underset{\mathcal{K} \in \mathcal{R}}{\text{argmax}} \sum_{k=1}^{K(\mathcal{K})} \sum_{s=1}^{S_k(\mathcal{K})} \dfrac{\left\| b_{k,s}^H(\mathcal{K}) H_{nk(\mathcal{K})} t_{k,s}(\mathcal{K}) \right\|^2}{\|b_{k,s}(\mathcal{K})\|^2 \sigma^2 + \sum_{(k',s') \neq (k,s)} \left\| b_{k,s}^H(\mathcal{K}) H_{n_k(\mathcal{K})} t_{k',s'}(\mathcal{K}) \right\|^2}$$

where $\mathcal{R}$ is a set of K that the scheduler searches over, $b_{k,s}(\mathcal{K})$ and $t_{k,s}(\mathcal{K})$ represents the sth columns of $B_k^T(\mathcal{K})$ and $T_k(\mathcal{K})$, respectively, with $B_k(\mathcal{K})$ and $T_k(\mathcal{K})$ be the filtering and precoding matrixes for the kth user in $\mathcal{K}$. Here, $B_k(\mathcal{K})$ and $T_k(\mathcal{K})$ are obtained through the above Steps 1~5 by setting $K=K(\mathcal{K})$, $\{S_k\}=\{S_k(\mathcal{K})\}$, and $\{H_k\}=\{H_{n_k(\mathcal{K})}\}$. The size of $\mathcal{R}$ depends on the used scheduling strategy. For example, with full search scheduling, $\mathcal{R}$ includes all possibilities of $\mathcal{K}$. Once $\hat{\mathcal{K}}$ is selected, the $\{S_k(\hat{\mathcal{K}}), k=1\sim K(\hat{\mathcal{K}})\}$ number of data streams are transmitted to the $K(\hat{\mathcal{K}})$ number of users over the same time-frequency resource by multiuser precoding with the precoding matrixes $\{T_k(\hat{\mathcal{K}}), k=1\sim K(\hat{\mathcal{K}})\}$.

Multiuser Precoding and Scheduling with Imperfect CSI According to the Present Invention Denote by $\overline{H}_k$ the imperfect channel matrix of user k available at the BS, and $\tilde{H}_k = H_k - \overline{H}_k$ the CSI error for user k. Assume that the elements in $\{\tilde{H}_k\}$ are random variables of i.i.d. with a mean of zero and a variance of $\tilde{\sigma}^2$. The $\{\tilde{H}_k\}$ can be attributable to various factors, such as feedback quantization, feedback delay and the like. Also assume that the value of $\tilde{\sigma}^2$ is available at the transmitter. The value of $\tilde{\sigma}^2$ can be obtained by various measures such as measuring channel estimation error, feedback error, and quantization error, etc., and then feeding back from the receiver to the transmitter.

CCI-Estimation-Aided S-MMSE Precoding

With imperfect CSI, the channel model in the equation (3) is modified to $$\hat{x}_k = B_k(\overline{H}_k + \tilde{H}_k) \sum_{k'=1}^{K} T_{k'} x_{k'} + B_k n_k \qquad (13)$$

For the optimization of filtering matrixes $\{B_k\}$ with given $\{T_k\}$, the equation (13) can be rewritten as $$\hat{x}_k = B_k \left( \overline{H}_k \sum_{k'=1}^{K} T_{k'} x_{k'} + \tilde{H}_k \sum_{k'=1}^{K} T_{k'} x_{k'} + n_k \right) \qquad (14)$$

$$= B_k \left( \overline{H}_k \sum_{k'=1}^{K} T_{k'} x_{k'} + n_k \right)$$

where $\eta_k = \tilde{H}_k \Sigma_{k'} T_{k'} x_{k'} + n_k$ is a term of CCI-plus-noise including both the CCI due to CSI error and the AWGN. By approximating $\eta_k$ as a vector of complex Gaussian noise, the optimal $\{B_k\}$ can be generated as $$B_k = T_k^H \overline{H}_k^H \left( \sum_{k'=1}^{K} \overline{H}_k T_{k'} T_{k'}^H \overline{H}_k^H + E(n_k n_k^H) \right)^{-H} \qquad (15)$$

where $$E(n_K n_k^H) = E\left( \sum_{k'=1}^{K} \tilde{H}_k T_{k'} x_{k'} x_{k'}^H T_{k'}^H \tilde{H}_k^H \right) +$$

$$\sigma^2 I \overset{(a)}{\approx} E\left( \sum_{k'=1}^{K} \tilde{H}_k T_{k'} T_{k'}^H \tilde{H}_k^H \right) + \sigma^2 I$$

$$= \sum_{k'=1}^{K} \begin{pmatrix} (vec(T_{k'})^T \otimes I_{N_R}) \times (I_{S_{k'}} \otimes \tilde{R}_k) \times \\ (vec(T_{k'})^T \otimes I_{N_R})^H \end{pmatrix} + \sigma^2 I \qquad (16)$$

In the equation (16), (a) is derived by approximating each $x_k x_k^H$ as I for all k, $vec(A) = [a_1^T \ldots a_j^T \ldots]^T$ with $a_j$ being the jth column of the matrix A, "⊗" denotes the Kronecker product, and $\tilde{R}_k = E(\text{vec}(\tilde{H}_k)\text{vec}(\tilde{H}_k)^H) = \tilde{\sigma}^2 I_{N_R \times N_T}$ is the covariance matrix of CSI error, $\text{vec}(\tilde{H}_k)$.

For the optimization of precoding matrixes $\{T_k\}$ with given $\{B_k\}$, the equation (13) can be rewritten in a compact form as $$\hat{x} = B(\overline{H} + \tilde{H})Tx + Bn = B\overline{H}Tx + B\tilde{H}Tx + Bn = B\overline{H}Tx + \mu \quad (17)$$

where $$\hat{x} = [\hat{x}_1^T \hat{x}_2^T \ldots \hat{x}_K^T]^T, \quad (18)$$

$$\overline{H} = [\overline{H}_1^T \overline{H}_2^T \ldots \overline{H}_K^T]^T, \quad (19)$$

$$\tilde{H} = [\tilde{H}_1^T \tilde{H}_2^T \ldots \tilde{H}_K^T]^T, \quad (20)$$

$$T = [T_1 T_2 \ldots T_K], \quad (21)$$

$$n = [n_1^T n_2^T \ldots n_K^T]^T, \quad (22)$$

$$\mu = B\tilde{H}Tx + Bn, \quad (23)$$

and B is defined in the equation (9). Similarly, $\mu$ is a term of CCI-plus-noise including both the CCI due to CSI error and the AWGN. By approximating $\mu$ as a vector of complex Gaussian noise, the optimal $\{T_k\}$ can be generated as $$[T_1 \ldots T_K] = \overline{H}^H B^H \left( B\overline{H}\overline{H}^H B^H + \frac{1}{P_T} E(\mu\mu^H) \right)^{-1} \quad (24)$$

where $$E(uu^H) = E(B\tilde{H}Txx^H T^H \tilde{H}^H B^H) + \sigma^2 \text{trace}(BB^H)I \quad (25)$$

$$\stackrel{(a)}{\approx} P_T E(B\tilde{H}\tilde{H}^H B^H) + \sigma^2 \text{trace}(BB^H)I$$

$$= P_T B\tilde{R}B^H + \sigma^2 \text{trace}(BB^H)I$$

In the equation (25), (a) is derived by approximating $Txx^H T^H$ as $P_T I$, and $\tilde{R} = E(\tilde{H}\tilde{H}^H) = \tilde{\sigma}^2 I_{N_R \times K}$ is the covariance matrix of $\tilde{H}$, which can be calculated from the covariance matrix $\{\tilde{R}_k\}$ of CSI error.

By replacing the equations (7) and (11) in the above Steps 1~5 with the equations (15) and (24), the CCI-estimation-aided S-MMSE precoding algorithm of the present invention can be obtained.

CCI-Estimation-Aided Multiuser Scheduling

The channel model in the equation (13) can be rewritten for imperfect CSI as $$\hat{x}_k = B_k \overline{H}_k T_k x_k + B_k \overline{H}_k \sum_{k' = k} T_{k'} x_{k'} + B_k n_k \quad (26)$$

Then, for each user/mode subset K, the scheduler estimates the achievable capacity by approximating $B_k \eta_k$ as a vector of complex Gaussian noise, as given in the equation $$C(\mathcal{K}) = \sum_{k=1}^{K(\mathcal{K})} \sum_{s=1}^{S_k(\mathcal{K})} \frac{\left\| b_{k,s}^H(\mathcal{K}) \overline{H}_{nk}(\mathcal{K}) t_{k,s}(\mathcal{K}) \right\|^2}{\sum_{(k',s') \neq (k,s)} \left\| b_{k,s}^H(\mathcal{K}) \overline{H}_{n_k(\mathcal{K})} t_{k's'}(\mathcal{K}) \right\|^2 + E(\| b_{k,s}^H(\mathcal{K}) n_k(\mathcal{K}) \|^2)} \quad (27)$$

$$= \sum_{k=1}^{K(\mathcal{K})} \sum_{s=1}^{S_k(\mathcal{K})} \frac{\left\| b_{k,s}^H(\mathcal{K}) \overline{H}_{nk}(\mathcal{K}) t_{k,s}(\mathcal{K}) \right\|^2}{\sum_{(k',s') \neq (k,s)} \left\| b_{k,s}^H(\mathcal{K}) \overline{H}_{n_k(\mathcal{K})} t_{k's'}(\mathcal{K}) \right\|^2 + b_{k,s}^H(\mathcal{K}) E(n_k(\mathcal{K}) n_k^H(\mathcal{K})) b_{k,s}(\mathcal{K})}$$

where $$n_k(\mathcal{K}) = \tilde{H}_{n_k(\mathcal{K})} \sum_{k'=1}^{K(\mathcal{K})} T_{k'}(\mathcal{K}) x_{k'} + n_k$$

and $E(\eta_k(\mathcal{K}) \eta_k^H(\mathcal{K}))$ can be calculated with the equation (16). Then, the CCI-estimation-aided scheduling algorithm selects $\hat{\mathcal{K}}$ according to the following criterion $$\hat{\mathcal{K}} = \underset{\mathcal{K} \in \mathcal{R}}{\arg\max} C(\mathcal{K}). \quad (28)$$

Hereinafter, the preferred embodiments of the present invention will be described in detail by referring to the drawings.

FIG. 1 is a flow chart of a method of multiuser precoding and scheduling according to the present invention.

According to the present invention, in step 101, CSI (which may be not accurate due to various factors such as feedback quantization, feedback delay) and statistic properties of CSI error are fed back to the BS from the UE. The CSI is an estimation of a channel matrix, and the statistic properties of CSI error are those of an error matrix of the estimation of the channel matrix. For example, as illustrated above, the estimation of the channel matrix may be $\overline{H}_k$, and the statistic properties of the CSI error may be the covariance matrix $\{\tilde{R}_k\}$. In step 103, the multiuser precoding matrix and scheduling scheme are generated by the BS, according to the feedback CSI and the statistic properties of CSI error. As illustrated above. the multiuser precoding may use the MMSE-type algorithm, and the multiuser scheduling may use the capacity-maximization criterion. Finally, in step 105, user data are multiuser precoded and scheduled by using the generated multiuser precoding matrix and scheduling scheme.

Figure 2:
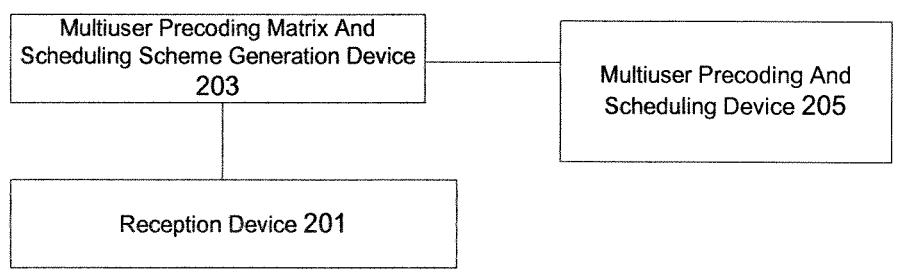
FIG. 2 is a block diagram of a BS for implementing the method of multiuser precoding and scheduling according to the present invention.

FIG. 2 is a block diagram of the BS for implementing the method of multiuser precoding and scheduling according to the present invention. As shown in FIG. 2, the BS comprises a reception device 201, a multiuser precoding matrix and scheduling scheme generation device 203, and a multiuser precoding and scheduling device 205. The reception device 201 receives the CSI and the statistic properties of CSI error which are fed back from the UE. The multiuser precoding matrix and scheduling scheme generation device 203 generates the multiuser precoding matrix and scheduling scheme, according to the feedback CSI and the statistic properties of CSI error. The multiuser precoding and scheduling device 205 performs multiuser precoding and scheduling on the user data by using the generated multiuser precoding matrix and scheduling scheme.

Figure 3:
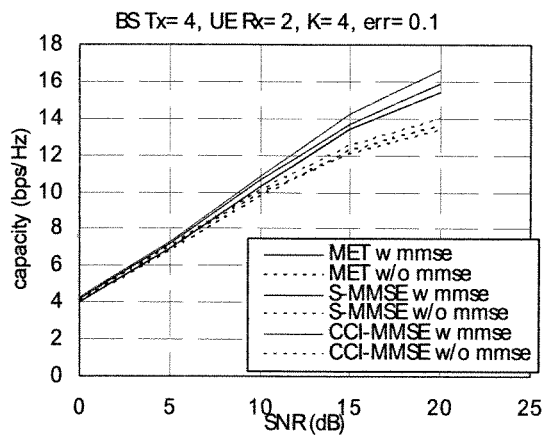
FIGS. 3 and 4 are graphs of performance comparison between the method according to the present invention and the prior art method.
Figure 4:
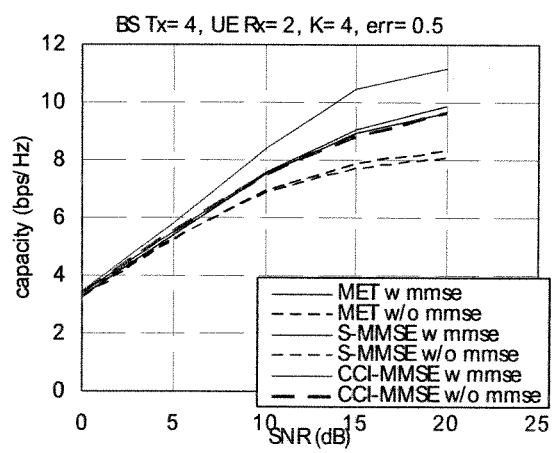

FIGS. 3 and 4 are graphs showing performance comparison between the method according to the present invention and the prior art method. As shown in FIGS. 3 and 4, the CCI-estimation-aided MU-MIMO scheme according to the present invention is compared with the conventional MU-MIMO scheme based on the original S-MMSE and MET algorithms with greedy scheduling strategy. Here, 4 transmit antennas are arranged at the base station, 2 receive antennas per user, and the total number of users is 4. The elements in channel matrixes $\{H_k\}$ are modeled as complex white Gaussian variables of i.i.d. with a mean of zero and a unit variance. The elements in CSI error matrixes $\{\tilde{H}_k\}$ are modeled as complex white Gaussian noises of i.i.d. with a mean of zero and a variance of $\tilde{\sigma}^2$. In the present invention, $\tilde{\sigma}^2$ is set to be 0.1 and 0.5 in FIGS. 3 and 4, respectively. Both MMSE and non-MMSE receivers are considered. As can be seen, the proposed scheme in the present invention outperforms MET and S-MMSE with greedy scheduling for both MMSE and non-MMSE receiver, especially when the CSI error is high.

The present invention has the following advantages.

1. It greatly improves the system performance of MU-MIMO when imperfect CSI is used at the transmitter(this is a realistic situation in practice).
2. It brings only marginal additional complexity at the BS and no additional complexity at UEs.
3. It is flexible with respect to causes of CSI error, such as channel estimation error, quantization error, feedback error, etc, and can be used with various MU-MIMO mechanisms, for example, based on sounding and feedback.

In summary, MU-MIMO operation is a hot topic in many broadband radio communication standards, such as IEEE 802.16 and 3GPP LTE, due to its great potential to improve cell throughput. The CSI error at the transmitter is one of the practical problems that restrict the application of MU-MIMO in real systems. The solution provided by the present invention can bring apparent advantages at the cost of marginal additional complexity at the BS.

The above is only the preferred embodiments of the present invention and the present invention is not limited to the above embodiments. Therefore, any modifications, substitutions and improvements to the present invention are possible without departing from the spirit and scope of the present invention.

What is claimed is:

1. A method of multiuser precoding and scheduling, comprising:
   receiving channel state information (CSI) and statistic properties of CSI error feedback at a base station (BS) from a user equipment (UE);
   generating, at the BS, multiuser precoding matrix and scheduling scheme according to the feedback CSI and the statistic properties of CSI error; and
   performing multiuser precoding and scheduling on user data by using the generated multiuser preceding matrix and scheduling scheme.

2. The method according to the claim 1, wherein the CSI is an estimation of a channel matrix.

3. The method according to claim 2, wherein the statistic properties of CSI error comprise a covariance matrix of error of the estimation of the channel matrix.

4. The method according to claim 1, wherein the multiuser precoding uses a minimum-mean-square-error (MMSE)-type algorithm.

5. The method according to claim 4, wherein the MMSE-type algorithm is a successive MMSE algorithm.

6. The method according to claim 1, wherein the multiuser scheduling uses a capacity-maximization criterion.

7. The method according to claim 1, wherein the statistic properties of the CSI error are obtained by measuring channel estimation error, feedback error and quantization error, and then fed back to a transmitter from a receiver.

8. The method according to claim 1, wherein the method is used in a multiuser multiple input multiple output (MU-MIMO) communication system.

9. A base station comprising:
   a reception device for receiving CSI and statistic properties of CSI error which are fed back from a user equipment (UE);
   a multiuser precoding matrix and scheduling scheme generation device for generating multiuser precoding matrix and scheduling scheme according to the feedback CSI and the statistic properties of CSI error; and
   a multiuser precoding and scheduling device for performing multiuser precoding and scheduling on user data by using the generated multiuser precoding matrix and scheduling scheme.

10. The base station according to claim 9, wherein the CSI is an estimation of a channel matrix.

11. The base station according to claim 10, wherein the statistic properties of CSI error comprise a covariance matrix of error of the estimation of the channel matrix.

12. The base station according to claim 9, wherein the multiuser precoding uses a minimum-mean-square-error (MMSE)-type algorithm.

13. The base station according to claim 12, wherein the MMSE-type algorithm is a successive MMSE algorithm.

14. The base station according to claim 9, wherein the multiuser scheduling uses a capacity-maximization criterion.

15. The base station according to claim 9, wherein the statistic properties of the CSI error are obtained by measuring channel estimation error, feedback error and quantization error, and then fed back to a transmitter from a receiver.

16. The base station according to claim 9, wherein the base station is used in a multiuser multiple input multiple output (MU-MIMO) communication system.

* * * * *